(12) United States Patent
Voorhies et al.

(10) Patent No.: US 12,293,194 B2
(45) Date of Patent: *May 6, 2025

(54) DETERMINING EXPECTED HASH-VALUES IN FUNCTIONS WITH CONTROL FLOW

(71) Applicant: Google LLC, Mountain View, CA (US)

(72) Inventors: Nathaniel Casey Voorhies, Menlo Park, CA (US); Antonio Cortes Perez, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,731

(22) Filed: Jan. 18, 2024

(65) Prior Publication Data
US 2024/0152361 A1 May 9, 2024

Related U.S. Application Data

(63) Continuation of application No. 17/427,406, filed as application No. PCT/US2020/053550 on Sep. 30, 2020, now Pat. No. 11,880,688.

(51) Int. Cl.
*G06F 9/38* (2018.01)
*G06F 16/901* (2019.01)

(52) U.S. Cl.
CPC ........ *G06F 9/3867* (2013.01); *G06F 16/9014* (2019.01)

(58) Field of Classification Search
CPC .... G06F 9/3867; G06F 9/30058; G06F 21/54; G06F 21/566; G06F 16/9014
See application file for complete search history.

(56) References Cited

U.S. PATENT DOCUMENTS

| 7,644,271 | B1 | 1/2010 | Chen et al. |
| 7,684,563 | B1 | 3/2010 | Olson et al. |
| 7,921,110 | B1* | 4/2011 | Ting ................ G06F 16/90344 707/758 |

(Continued)

FOREIGN PATENT DOCUMENTS

| CN | 109643345 B | 7/2023 |
| EP | 1942431 | 7/2008 |
| WO | 2022071943 | 4/2022 |

OTHER PUBLICATIONS

"International Preliminary Report on Patentability", Application No. PCT/US2020/053550, Mar. 28, 2023, 10 pages.

(Continued)

*Primary Examiner* — Farley Abad
(74) *Attorney, Agent, or Firm* — Colby Nipper PLLC

(57) ABSTRACT

This document describes techniques and apparatuses that enable determining expected hash-values in functions with control flow. A computing device receives a function comprising function instructions within at least three basic blocks connected via multiple execution paths. Hash-input instructions are inserted within a plurality of the basic blocks that indirectly force hash values at the respective insertion points. Hash values at ends of the plurality of the basic blocks are set to a canonical value and an expected hash-value and hash input-values are calculated using a hash function. By using the canonical value and the hash input-values, the expected hash-value is the same regardless of which execution path is executed.

20 Claims, 9 Drawing Sheets

(56) References Cited

U.S. PATENT DOCUMENTS

| | | | |
|---|---|---|---|
| 2007/0255980 A1* | 11/2007 | Endo | G06F 21/52 |
| | | | 714/E11.178 |
| 2010/0031012 A1 | 2/2010 | Rotondo et al. | |
| 2010/0220853 A1 | 9/2010 | Schneider | |
| 2013/0124840 A1* | 5/2013 | Diluoffo | G06F 21/575 |
| | | | 713/2 |
| 2013/0263255 A1* | 10/2013 | Wolf | G06F 21/64 |
| | | | 726/21 |
| 2013/0343377 A1 | 12/2013 | Stroud et al. | |
| 2014/0200166 A1 | 7/2014 | Van Rooyen et al. | |
| 2018/0089422 A1* | 3/2018 | Kounavis | G06F 21/54 |
| 2022/0300291 A1 | 9/2022 | Voorhies et al. | |
| 2022/0358211 A1 | 11/2022 | Jada et al. | |

OTHER PUBLICATIONS

"International Search Report and Written Opinion", Application No. PCT/US2020/053550, May 20, 2021, 13 pages.
"Non-Final Office Action", U.S. Appl. No. 17/427,406, filed May 9, 2023, 12 pages.
"Notice of Allowance", U.S. Appl. No. 17/427,406, filed Sep. 12, 2023, 8 pages.
"Foreign Office Action", CN Application No. 202080105642.1, Sep. 3, 2024, 21 pages.

* cited by examiner

DETERMINING EXPECTED HASH-VALUES IN FUNCTIONS WITH CONTROL FLOW

RELATED APPLICATIONS

This application is a continuation of and claims priority to U.S. patent application Ser. No. 17/427,406, filed on Jul. 30, 2021, which in turn claims priority to International Patent Application Serial No. PCT/US2020/053550, filed on Sep. 30, 2020, the disclosures of which are incorporated by reference herein in their entireties.

BACKGROUND

Modern computing devices process large amounts of instructions (e.g., from operating systems, applications, or components). Many of these instructions contain sensitive information or provide access to sensitive information. As such, security is an ever-increasing factor, not only in software, but in processing systems as well.

One aspect of processing system security is ensuring that every instruction that should be executed is executed. For example, a malicious attacker (e.g., a person, machine, or software) may be able to cause an execution fault that skips an instruction or causes the instruction to perform differently than intended (e.g., not jump to an instruction or block of instructions defined by the skipped instruction). By not executing the instruction as intended, security vulnerabilities may be exposed (e.g., an authentication process may not be performed).

Hash values may be used to ensure that an instruction or a block of instructions are executed. For example, a processor can hash one or more executed instructions and compare the resulting hash value to an expected hash-value. A match between the resulting and expected hash-values may result in a determination that no fault (adversarial or otherwise) occurred (e.g., the instructions were executed as intended). However, a mismatch of the resulting and expected hash values may be indicative of a fault.

One problem arises when a function (e.g., multiple instructions) contains multiple execution paths. It is straightforward to protect a function by initializing and checking hash values (e.g., via reset-hash and check-hash instructions) within each basic block that is executed. Doing so is not only computationally intensive but may fail to protect branch instructions (e.g., if/else instructions) as well. Accordingly, such approaches may be unable to protect all lines of code within a function having multiple execution paths with a single expected hash-value.

SUMMARY

Techniques and apparatuses are described that enable determining expected hash-values in functions with control flow. These techniques and apparatuses enable a single check-hash instruction to be used to protect all instructions within a function that has multiple execution paths (e.g., control flow). In this way, security may be enhanced by not leaving instructions unprotected. Furthermore, processing overhead may be decreased by reducing a number of hashing operations.

Aspects described below include a method performed by a computing device. The method receives a function with a plurality of basic blocks comprising respective portions of function instructions and at least two execution paths between a first basic block and a second basic block. The method establishes a hash function used to compute hash values at respective executed-instruction states of the function instructions and inserts a reset-hash instruction within the first basic block. The method then selects a target executed-instruction state within the second basic block and inserts a check-hash instruction at the target executed-instruction state. The method further inserts respective hash-input instructions within each of the plurality of basic blocks other than the second basic block. The hash-input instructions set respective hash input-values to the hash function for computing hash values at executed-instruction states of the hash-input instructions. The method then determines an expected hash-value at the target executed-instruction state and the hash input-values for the hash-input instructions based on the initial hash-value, a canonical value, and the hash function. Then, the method compiles the function with the function instructions, the reset-hash instruction, the hash-input instructions with the corresponding hash input-values, and the check-hash instruction with the expected hash-value at the target executed-instruction state.

Aspects described below also include a method performed by a computing device. This method executes function instructions to arrive at a target executed-instruction state. The function instructions are comprised by a plurality of basic blocks of the function instructions and have at least two execution paths between a first basic block and a second basic block. The method also executes hash instructions to arrive at a hash value at the target executed-instruction state. The hash instructions include respective hash-input instructions within each of the plurality of basic blocks other than the second basic block. The method then compares the hash value at the target executed-instruction state to an expected hash-value at the target executed-instruction state. The expected hash-value at the target executed-instruction state is irrespective of which of the execution paths were executed. The method then, responsive to the hash value at the target executed-instruction state not matching the expected hash-value of the executed-instruction state, performs a security function.

BRIEF DESCRIPTION OF THE DRAWINGS

Apparatuses of and techniques enabling determining expected hash-values in functions with control flow are described with reference to the following drawings. The same numbers are used throughout the drawings to reference like features and components.

DETAILED DESCRIPTION

Overview

Comparing hash values of executed instructions of a function against expected hash-values may be a useful tool for determining that instructions have been executed. If, however, a function comprises multiple execution paths (e.g., multiple basic blocks with at least one branch instruction), straightforward approaches initialize and check hash values within each basic block (e.g., they do not hash the function as a whole). This causes three problems: 1) computational overhead is high due to the additional hashing instructions and hashing comparisons, 2) the function as a whole cannot be checked, and 3) the branch instructions are not protected. This may lead to poor system performance as well as security vulnerabilities.

This document describes techniques and apparatuses that enable determining expected hash-values in functions with control flow. A compiler receives a function comprising function instructions within at least three basic blocks. At least one of the basic blocks has a branch instruction such that the function has multiple execution paths. A reset-hash instruction is inserted in a first basic block (e.g., initial basic block) that sets an initial hash-value for the hash, and a check-hash instruction is inserted in a second basic block (e.g., final basic block) that checks an executed hash against an expected-hash. A hash-input instruction is also inserted within each basic block other than the second basic block. The hash-input instructions indirectly force the hash values at the respective insertion points. The function instructions are assigned hash inputs (e.g., instruction encodings), and expected hash-values at ends of each of the basic blocks other than the second basic block are set to a canonical value. Using a hash function, the instruction encodings, and the set hash values, hash values at each of the instructions, including the hash-input instructions, are determined. From there, the expected hash-value of the check-hash instruction and the hash input-values can be calculated using the hash function. The function is then compiled to include the function instructions, the hash function, the hash inputs for the function instructions, the reset-hash instruction, the check-hash instruction (including the expected hash-value), and the hash-input instructions (including the hash input-values). By doing so, the expected hash-value at an executed instruction state of the check-hash instruction is the same regardless of which execution path is executed.

Example Compiler Process Flow

Figure 1:
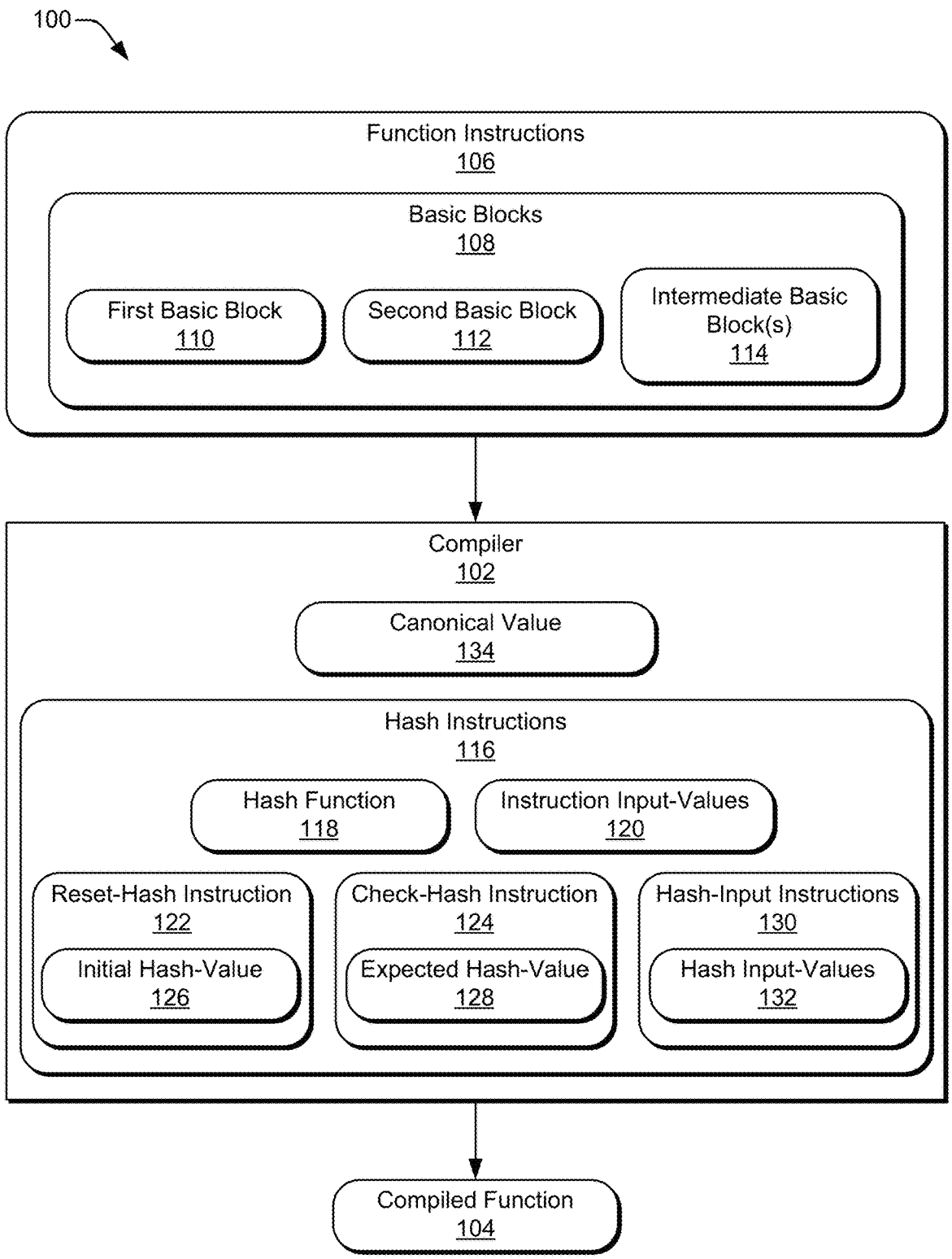
FIG. 1 illustrates an example process flow for determining expected hash-values in functions with control flow.

FIG. 1 illustrates an example process flow 100 for determining expected hash-values in functions with control flow. The process flow 100 is generally implemented in an electronic device (not shown) that is discussed below in regard to FIG. 2. As shown, the process flow 100 includes a compiler 102 that generates a compiled function 104 from function instructions 106 of a function. The function instructions 106 contain basic blocks of function instructions, e.g., basic blocks 108. Each of the basic blocks 108 contains a group of instructions (e.g., straight-line code sequence) with no branches except at the entry of the group and at the exit of the group. The function has at least three basic blocks 108: a first basic block 110, a second basic block 112, and one or more intermediate basic blocks 114. The first basic block 110 may be an initial basic block and the second basic block 112 may be a final basic block of the function. The function instructions 106 contain at least one branch function that enables at least two execution paths between the first basic block 110 and the second basic block 112. For example, an "if/else" instruction at the end of the first basic block 110 may cause the function to proceed to a first intermediate basic block (114-1) if the "if" is satisfied, otherwise a second intermediate basic block (114-2) is executed.

The compiler 102 receives the function instructions 106 and inserts or otherwise establishes a series of hash instructions 116 for the function. For example, the compiler 102 may establish a hash function 118 and instruction input-values 120 to be used as inputs to the hash function 118 for the function instructions 106. The instruction input-values 120 may be instruction encodings for each of the function instructions 106.

The compiler 102 inserts a reset-hash instruction 122 in the first basic block 110 and a check-hash instruction 124 in the second basic block 112. The reset-hash instruction 122 resets a hash value to an initial hash-value 126 and the check-hash instruction 124 checks an executed hash value to an expected hash-value 128 at a target executed-instruction state. In order to protect the entirety of the function, the reset-hash instruction 122 is generally inserted at the beginning of the first basic block 110 and the check-hash instruction 124 is generally inserted at the end of the second basic block 112 (before any exit/return instruction of the function). However, the reset-hash instruction 122 and the check-hash instruction 124 may be inserted in different locations within the respective basic blocks without departing from the scope of this disclosure.

The compiler 102 also inserts hash-input instructions 130 within the first basic block 110 and the intermediate basic blocks 114. One of the hash-input instructions 130 may be inserted between the reset-hash instruction 122 and a branch instruction in the first basic block 110. Others of the hash-input instructions 130 may be inserted prior to a branch or jump instruction in the intermediate basic block(s) 114. The hash-input instructions 130 set hash input-values 132 for the hash function 118 (analogous to the instruction input-values 120 for the function instructions 106).

The compiler 102 can then use a canonical value 134, the initial hash-value 126 from the reset-hash instruction 122, the instruction input-values 120, and the hash function 118 to determine the respective hash input-values 132 for the hash-input instructions 130 and the expected hash-value 128 of the check-hash instruction 124. The canonical value 134 may be based on the target executed-instruction state, such as a sum of instruction encodings above the target executed-instruction state. Regardless of which numerical value is used for the canonical value 134, the compiler 102 sets respective expected hash-values at final instructions of the first basic block 110 and the intermediate basic blocks 114 to the canonical value 134. Using the hash function 118, the compiler 102 then calculates expected hash-values at execution states of the function instructions 106 and at execution states of the hash-input instructions 130. From those calculated expected hash-values, and again using the hash function 118, the compiler 102 determines the hash input-values 132 and the expected hash-value 128 at the execution state of the check-hash instruction 124.

Next, the compiler 102 compiles the hash instructions 116 along with the function instructions 106 into the compiled function 104. The compiler 102 may utilize a table for the hash input-values 132, such that each hash-input instruction 130 has a corresponding hash input value 132 in the table. Alternatively, the hash input-values 132 can be part of the respective hash-input instructions 130. Furthermore, the compiled function 104 includes the instruction input-values 120 for each of the instructions and the hash function 118 (or indications thereof). In this way, when executed, the compiled function 104 can check an executed hash (using the check-hash instruction) against the expected hash-value 128 regardless of which execution path is executed.

Example Compiling Computing Device

Figure 2:
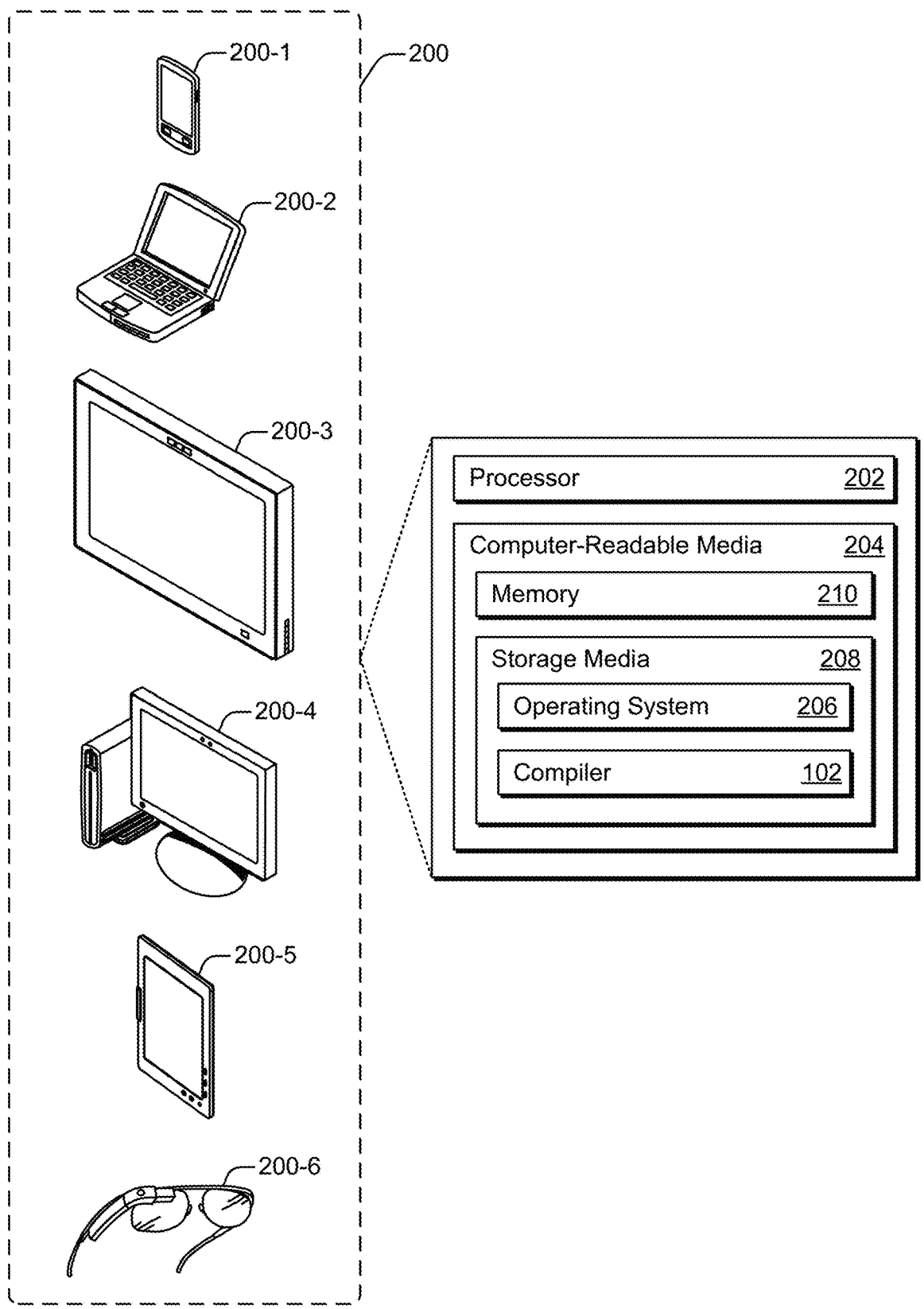
FIG. 2 illustrates an example electronic device in which determining expected hash-values in functions with control flow can be implemented.

FIG. 2 illustrates an example computing device 200 in which determining expected hash-values in functions with control flow can be implemented. The computing device 200 is illustrated with various non-limiting examples of the computing device 200: a smartphone 200-1, a laptop 200-2, a television 200-3, a desktop 200-4, a tablet 200-5, and a wearable device 200-6. As shown on the right, the computing device 200 includes at least one processor 202 and computer-readable media 204.

The processor 202 (e.g., an application processor, microprocessor, digital-signal processor (DSP), or controller) executes code stored within the computer-readable media 204 to implement an operating system 206 and the compiler 102 that are stored within a storage media 208 (e.g., one or more non-transitory storage devices such as a hard drive, SSD, flash memory, read-only memory (ROM), EPROM, or EEPROM) of the computer-readable media 204.

The computer-readable media 204, which may be transitory or non-transitory, also includes memory 210 (e.g., one or more non-transitory computer-readable storage devices such as a random access memory (RAM, DRAM, or SRAM)) that is accessed by the operating system 206 and the compiler 102.

The computing device 200 can include one or more communication systems (not shown) that enable wired and/or wireless communication of device data, such as received data, transmitted data, or other information as described above. Example communication systems include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, infrared (IR) transceivers compliant with an Infrared Data Association (IrDA) protocol, and wired local area network (LAN) Ethernet transceivers.

The computing device 200 may also include one or more data input ports (not shown) by which any type of data, media content, and/or other inputs can be received, such as user-selectable inputs, messages, applications, music, television content, recorded video content, and any other type of audio, video, and/or image data received from any content and/or data source. The data input ports may include USB ports, coaxial cable ports, fiber optic ports for optical fiber interconnects or cabling, and other serial or parallel connectors (including internal connectors) for flash memory, DVDs, CDs, and the like. These data input ports may be used to couple the electronic device to components, peripherals, or accessories such as keyboards, microphones, or cameras.

Although not shown, the computing device 200 can also include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

In some implementations, the computing device 200 also includes an audio and/or video-processing system (not shown) that processes audio data and/or passes through the audio and video data to an audio system (not shown) and/or to a display system (not shown) (e.g., a video buffer or a screen of a smart phone or camera). The audio system and/or the display system may include any components that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or another similar communication link, such as the media data port. In some implementations, the audio system and/or the display system are external or separate components of the computing device 200. Alternatively, the display system can be an integrated component of the example computing device 200, such as part of an integrated touch interface.

Example Expected Hash-Value Determination

Figure 3:
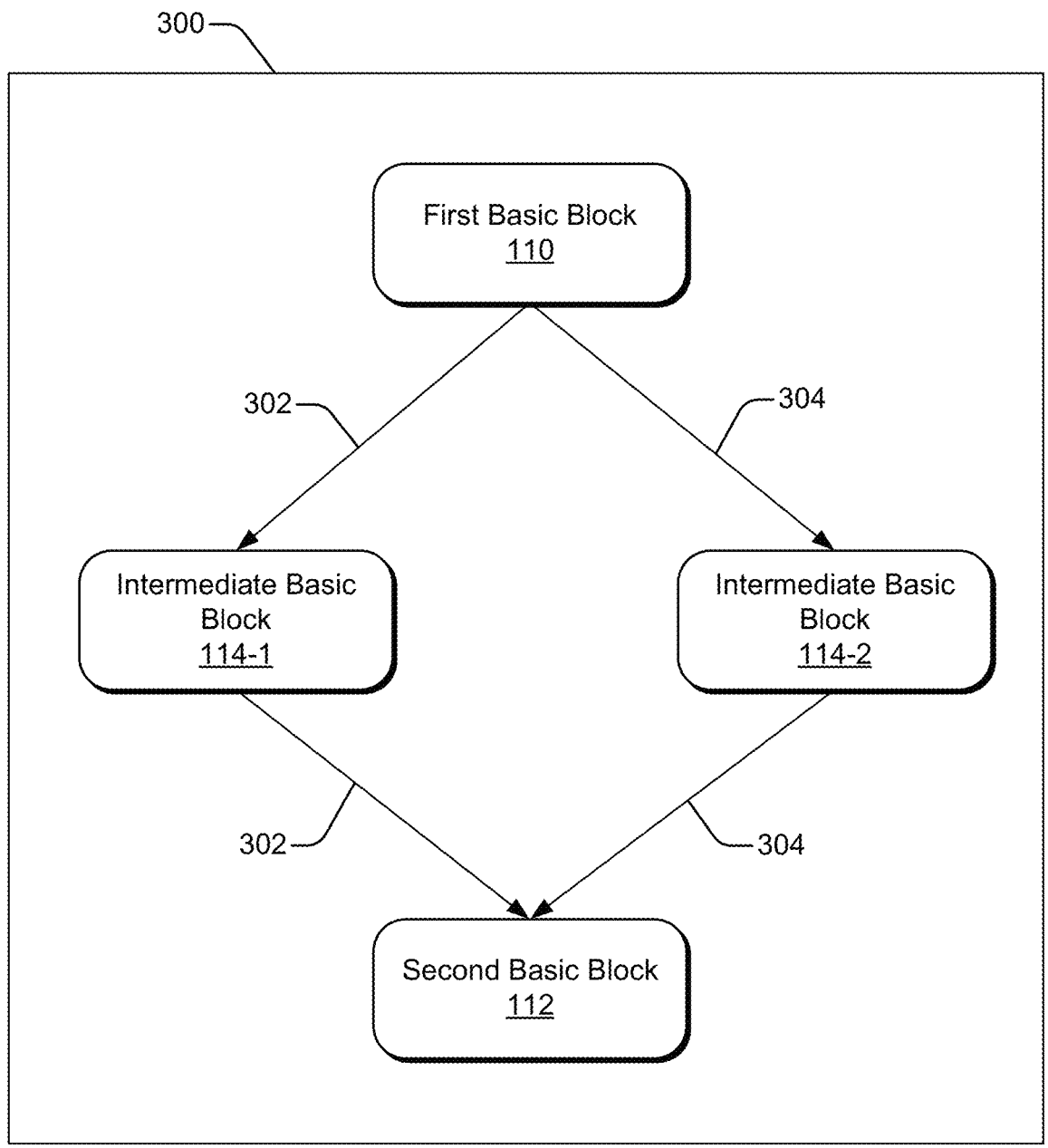
FIG. 3 illustrates an example function with basic blocks of function instructions.

FIG. 3 illustrates an example function 300 with basic blocks of function instructions. The example function 300 is as follows:

```
void f( ) {
    instruction A;
    if (condition) {
        instruction B;
    } else {
        instruction C;
    }
    instruction D;
    return;
}.
```

The basic blocks of the example function 300 include a first basic block (e.g., first basic block 110), which includes:
  instruction A;
    if (condition) {.
The example function 300 also has a second basic block (e.g., second basic block 112) which includes:
  instruction D;
  return.
The example function 300 also has a first intermediate basic block (e.g., intermediate basic block 114-1) which includes:
  instruction B;
  jump to second basic block 112.
The example function 300 also has a second intermediate basic block (e.g., intermediate basic block 114-2) which includes:
  instruction C;
  jump to second basic block 112.
The relationship of the basic blocks causes a first execution path 302 and a second execution path 304. One of ordinary skill will recognize the relationship of the conditional branch instruction and the jump instruction relative to the function code. For example, the jump instruction within the intermediate basic block 114-2 is optional. When not present, the intermediate basic block 114-2 may end "falling" directly into the second basic block 112.

As discussed above, the compiler adds (i) the reset-hash instruction 122 to the first basic block 110, (ii) the check-hash instruction 124 to the second basic block 112, and (iii)

hash-input instructions 130 to the basic blocks other than the second basic block. When completed, the basic blocks become:

First basic block 110
reset hash value to the initial hash-value 126 (reset-hash instruction 122)
instruction A;
use a hash input-value 132-1 to calculate hash value (hash-input instruction 130)
if (condition) {
Second basic block 112
instruction D;
check the hash value against the expected hash-value 128 (check-hash instruction 124)
return
Intermediate basic block 114-1
instruction B;
use a hash input-value 132-2 to calculate hash value (hash-input instruction 130)
jump to second basic block 112
Intermediate basic block 114-2
instruction C;
use a hash input value 132-3 to calculate hash value (hash-input instruction 130)
jump to second basic block 112.

The compiler then, using the hash function 118, calculates the hash input-values 132-1, 132-2, and 132-3 as well as the expected hash-value 128. An example implementation of how the hash input-values 132-1, 132-2, and 132-3 and the expected hash-value 128 are calculated is illustrated in FIG. 4.

Figure 4:
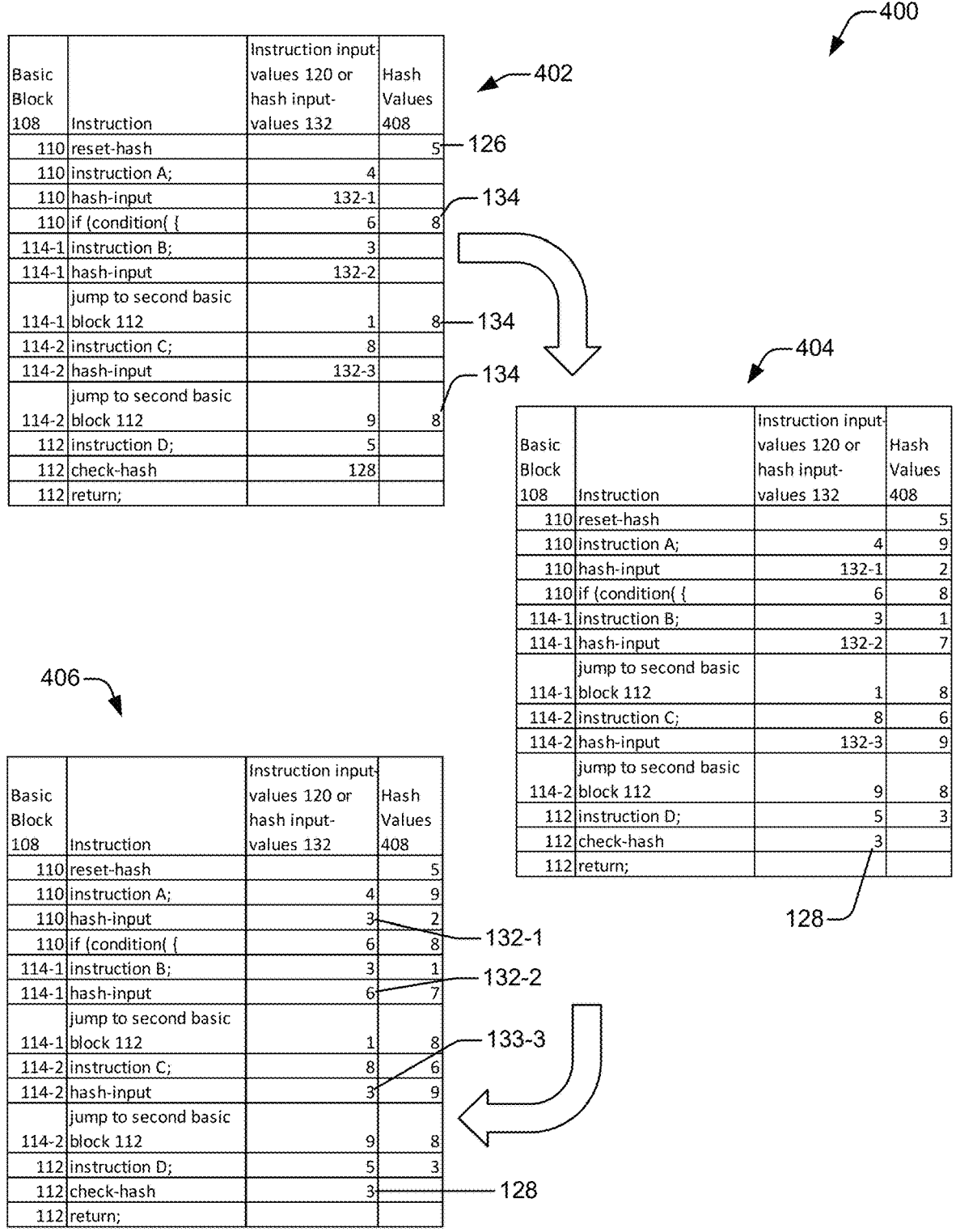
FIG. 4 illustrates an example implementation of the techniques described herein applied to the example function of FIG. 3.

FIG. 4 illustrates an example implementation 400 of the techniques described herein applied to the example function 300 of FIG. 3. Tables 402, 404, and 406 include the basic blocks 108 and corresponding function instructions 106 of the example function 300, the instruction input-values 120 or hash input-values 132 (depending on whether the instructions are function instructions 106 or hash-input instructions 130), and hash values 408 at each execution state. Initial values (e.g., known values) in table 402 and transitions of values in table 404 and table 406 (e.g., calculated values) are described below. Tables are illustrated for clarity, however, the compiler 102 may use any organizational techniques to compute the values.

The process starts with known or established values in table 402. The hash function 118 (from FIG. 1) is established as being h=(h+input)%10. The hash function 118 is arbitrary, however, and any hashing technique may be used without departing from the scope of the disclosure. The initial hash-value 126, in this example is 5 and the instruction input-values 120 for the function instructions 106 (e.g., instruction encodings) are set (4, 6, 3, 1, 8, 9, and 5).

Hash values 408 at final execution states of each of the basic blocks 108 other than the second basic block 112 are set to the canonical value 134, which is defined in this example as the numerical value 8. As discussed above, the canonical value 134 may be based on the target executed-instruction state, e.g., at check-hash instruction 124. The canonical value 134 may be any value to which the hash values 408 at the final execution states (including all) can be set. For example, the canonical value 134 may be based on the target executed-instruction state, e.g., based on all instructions that are above the target executed-instruction state.

Using the hash function 118, the values in table 404 can be calculated from the values in table 402. For example, the hash value 408 at an executed-instruction state of instruction A is 9 [(5+4)%10]. The hash value 408 at an executed-instruction state of the hash-input instruction 130 of the first basic block 110 is 2 [(x+6)%10=8]. This ensures that the hash value 408 at an executed-instruction state at the end of the first basic block 110 ("if" instruction) becomes the canonical value 134 (if the instructions are executed as designed). The expected hash-value 128 is the previous hash value 408, which, in this example, is 3.

Using the hash function 118 again, the hash input-values 132-1, 132-2, and 132-3 in table 406 can be calculated from the values in table 404. For example, the hash input value 132-1 is 3 [(9+x)%10=2], the hash input value 132-2 is 6 [(1+x)%10=7], and the hash input value 132-3 is 3 [(6+x)%10=9].

As stated above, with the hash input-values 132 and the expected hash-value 128 computed, the compiler 102 can compile the function for execution by a computing device. When executed, the expected hash-value 128 is the same regardless of execution path.

Example Execution Process Flow

Figure 5:
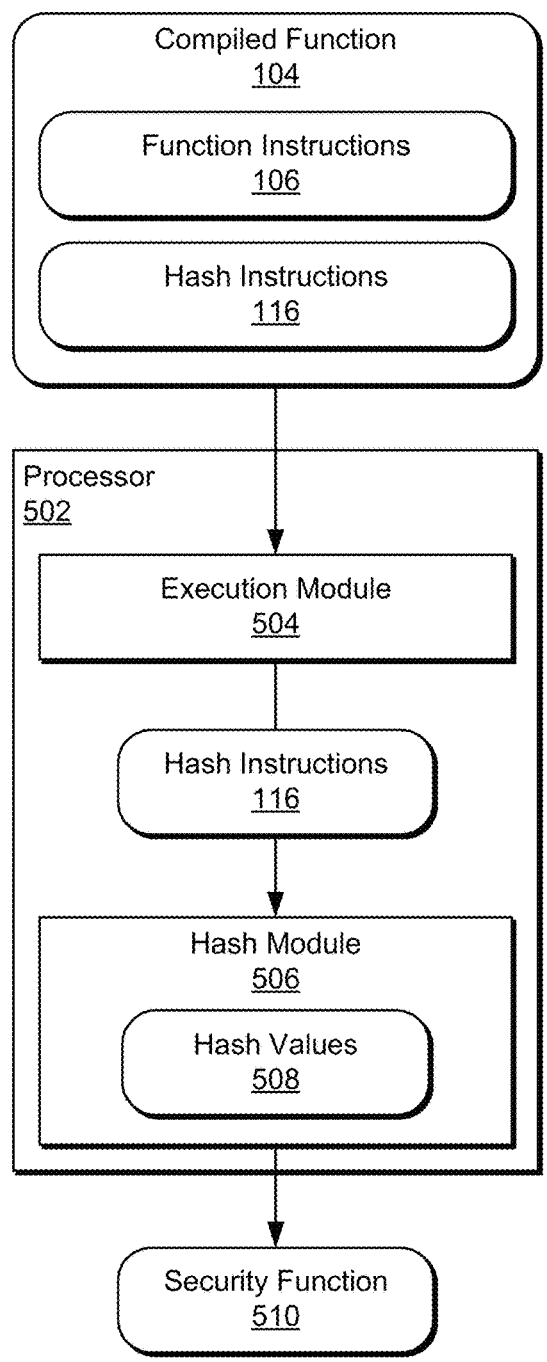
FIG. 5 illustrates an example process flow for using expected hash-values in functions with control flow.

FIG. 5 illustrates an example process flow 500 for using expected hash-values in functions with control flow. The process flow 500 is generally implemented in an electronic device (not shown) that is discussed below in regard to FIG. 6. As shown, the process flow 500 includes at least one processor 502 that executes the compiled function 104. The processor 502 has an execution module 504 that executes the function instructions 106 and a hash module 506 that executes the hash instructions 116. Although shown as modules of a single processor, the hash module 506 may be a separate piece of hardware from the execution module 504. The execution module 504 may relay the hash instructions 116 to the hash module 506 for determining and tracking hash values 508. The hash values 508 are similar to hash values 408, however, the hash values 508 are based on instructions that are actually executed.

As part of the hash instructions 116, the hash module 506 receives the expected hash-value 128 at a target executed-instruction state. When the target executed-instruction state is reached, the hash value 508 at the target executed-instruction state is compared to the expected hash-value 128. If a match is identified, no action is taken. However, if the hash value 508 at the target executed-instruction state and the expected hash-value 128 do not match, the mismatch indicates a fault and a security function 510 is executed. For example, the security function 510 may be an error code, a warning, a program-stop, a processor-lock, or any other suitable security protocol when a fault has been detected.

Because of the hash-input instructions 130 within each of the basic blocks 108 other than the second basic block 112, the expected hash-value 128 is the same regardless of which execution path is followed, e.g., through the intermediate basic block 114-1 or through the second intermediate basic block 114-2. In this way, the compiled function 104 is checked as a whole while protecting all of the function instructions 106.

Example Executing Computing Device

Figure 6:
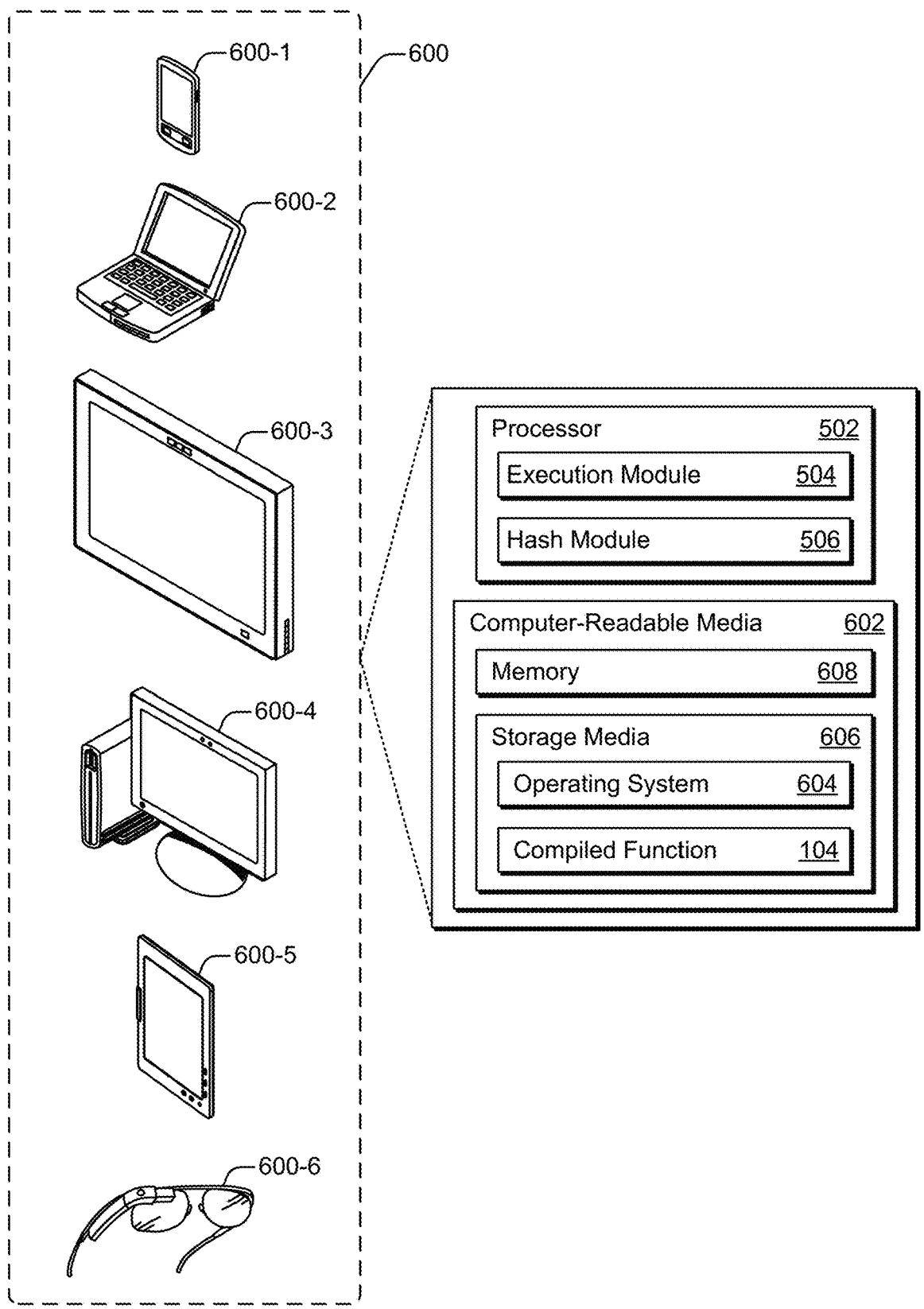
FIG. 6 illustrates an example electronic device in which using expected hash-values in functions with control flow can be implemented.

FIG. 6 illustrates an example computing device 600 in which using expected hash-values in functions with control flow can be implemented. The computing device 600, may, in some implementations, be the same as the computing device 200. For example, the computing device 600 may implement the compiler 102. The computing device 600 is illustrated with various non-limiting examples of the computing device 600: a smartphone 600-1, a laptop 600-2, a television 600-3, a desktop 600-4, a tablet 600-5, and a wearable device 600-6. As shown on the right, the computing device 600 includes the processor 502 and computer-readable media 602.

The processor 502 (e.g., an application processor, microprocessor, digital-signal processor (DSP), or controller) executes code stored within the computer-readable media 602 to implement an operating system 604 and the compiled function 104 that are stored within a storage media 606 (e.g., one or more non-transitory storage devices such as a hard drive, SSD, flash memory, read-only memory (ROM), EPROM, or EEPROM) of the computer-readable media 602.

The computer-readable media 602, which may be transitory or non-transitory, also includes memory 608 (e.g., one or more non-transitory computer-readable storage devices such as a random access memory (RAM, DRAM, or SRAM)) that is accessed by the operating system 604 and the compiled function 104.

The computing device 600 can include one or more communication systems (not shown) that enable wired and/or wireless communication of device data, such as received data, transmitted data, or other information as described above. Example communication systems include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, infrared (IR) transceivers compliant with an Infrared Data Association (IrDA) protocol, and wired local area network (LAN) Ethernet transceivers.

The computing device 600 may also include one or more data input ports (not shown) by which any type of data, media content, and/or other inputs can be received, such as user-selectable inputs, messages, applications, music, television content, recorded video content, and any other type of audio, video, and/or image data received from any content and/or data source. The data input ports may include USB ports, coaxial cable ports, fiber optic ports for optical fiber interconnects or cabling, and other serial or parallel connectors (including internal connectors) for flash memory, DVDs, CDs, and the like. These data input ports may be used to couple the electronic device to components, peripherals, or accessories such as keyboards, microphones, or cameras.

Although not shown, the computing device 600 can also include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

In some implementations, the computing device 600 also includes an audio and/or video-processing system (not shown) that processes audio data and/or passes through the audio and video data to an audio system (not shown) and/or to a display system (not shown) (e.g., a video buffer or a screen of a smart phone or camera). The audio system and/or the display system may include any components that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or another similar communication link, such as the media data port. In some implementations, the audio system and/or the display system are external or separate components of the computing device 200. Alternatively, the display system can be an integrated component of the example computing device 600, such as part of an integrated touch interface.

Example Methods

Figure 7:
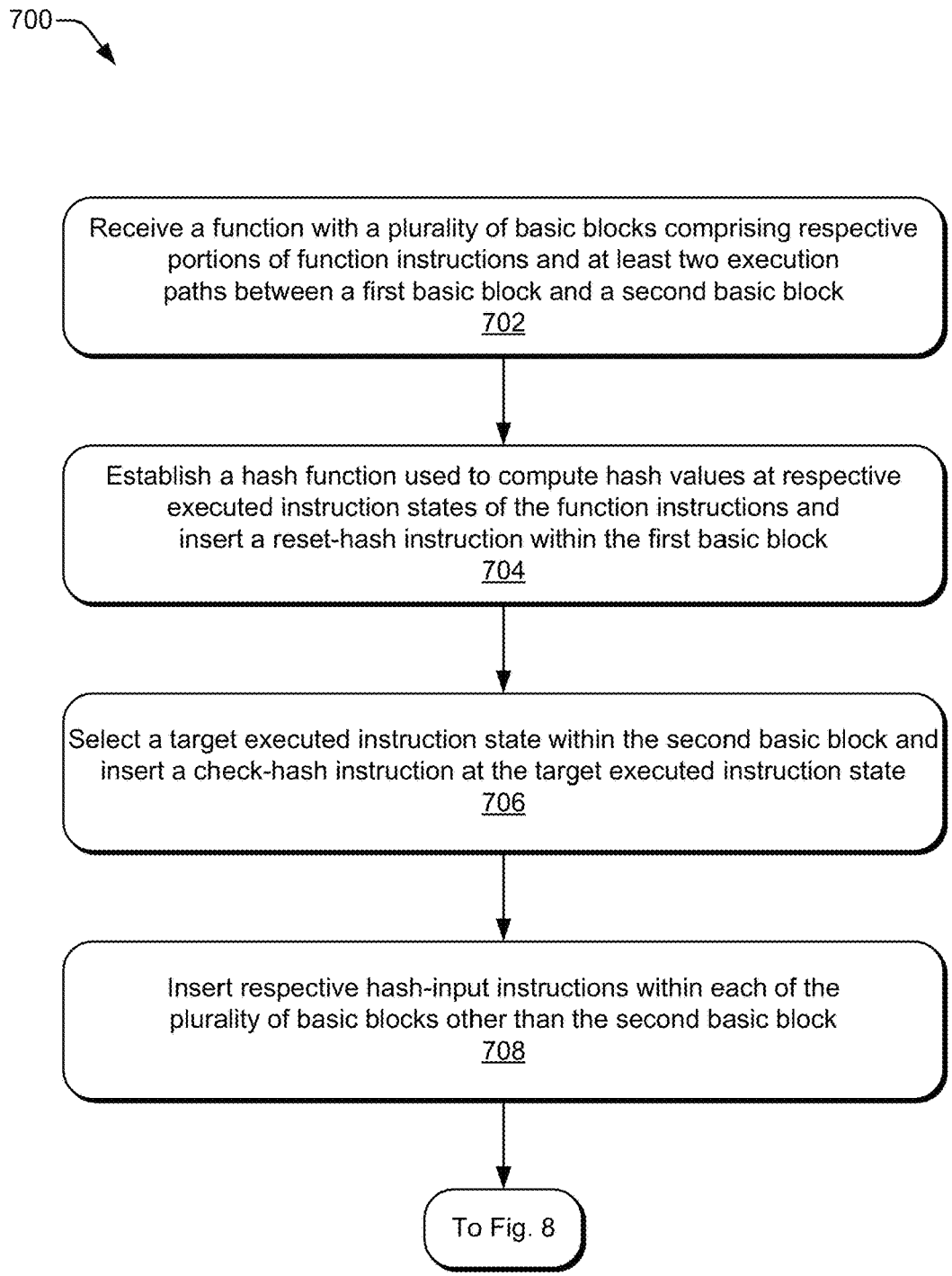
FIG. 7 illustrates a portion of an example method for determining expected hash-values in functions with control flow.
Figure 8:
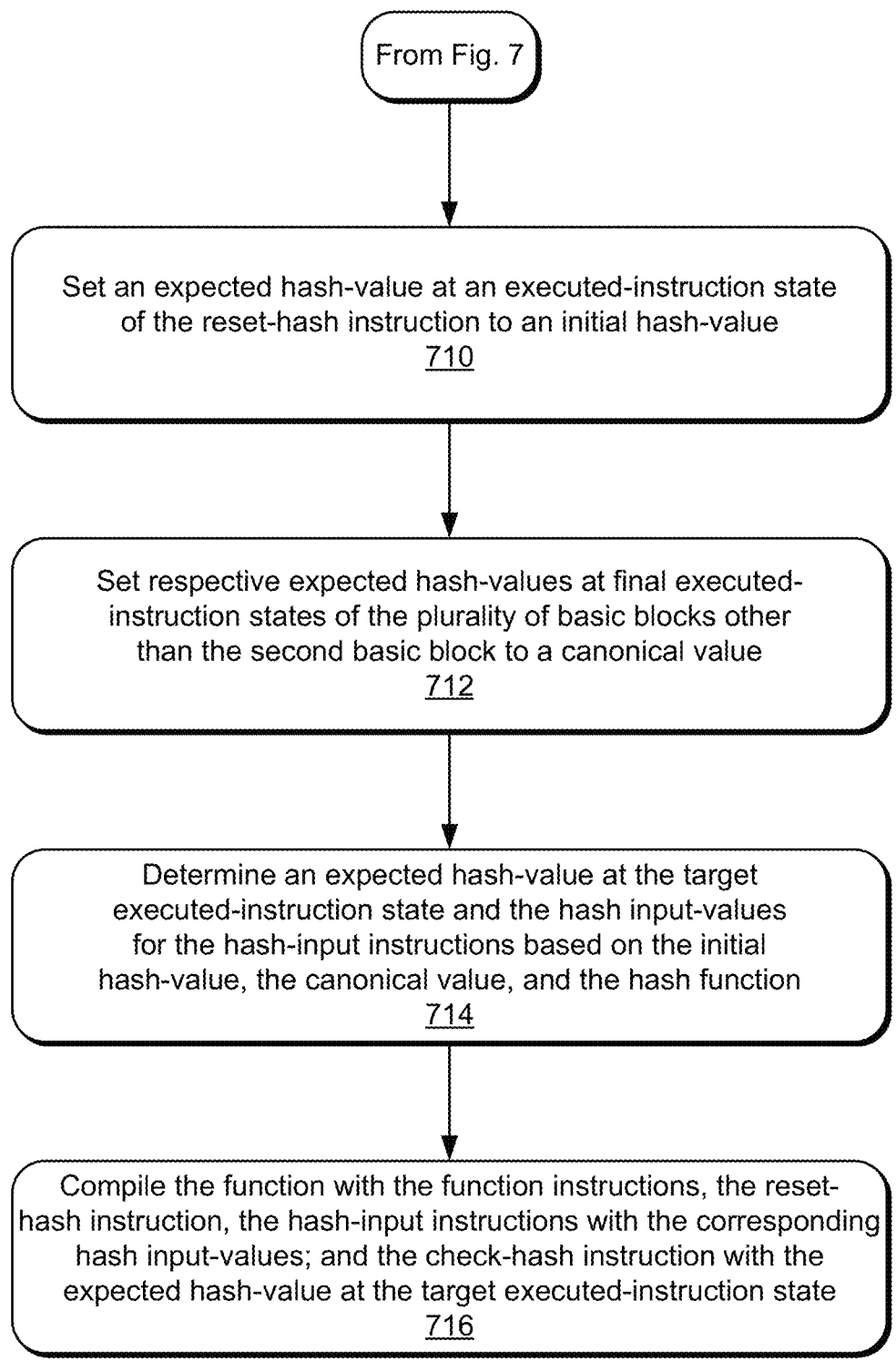
FIG. 8 illustrates another portion of the example method for determining expected hash-values in functions with control flow of FIG. 7.

FIGS. 7 and 8 illustrate an example method 700 for determining expected hash-values in functions with control flow. This method can be implemented utilizing the previously described examples, such as the process flow 100, the computing device 200, and the illustrations shown in FIGS. 3 and 4. Aspects of this method are illustrated as operations 702 through 716. The order in which operations of this method are shown and/or described is not intended to be construed as a limitation, and any number or combination of the described method operations can be combined in any order to implement a method or an alternate method.

At 702, a computing device receives a function with a plurality of basic blocks including respective portions of function instructions and at least two execution paths between a first basic block and a second basic block. For example, the computing device 200 may receive the function instructions 106 with a plurality of the basic blocks 108 including respective portions of the function instructions 106 and the first and second execution paths 302, 304 between the first basic block 110 and the second basic block 112.

At 704, the computing device establishes a hash function used to compute hash values at respective executed-instruction states of the function instructions and inserts a reset-hash instruction with a corresponding initial hash-value within the first basic block. For example, the computing device 200 may establish the hash function 118 used to compute the hash values 408 and insert the reset-hash instruction 122 with the initial hash-value 126 within the first basic block 110.

At 706, the computing device then selects a target executed-instruction state within the second basic block and inserts a check-hash instruction at the target executed-instruction state. For example, the computing device 200 may select the target executed-instruction state at the execution state for the instruction D and insert the check-hash instruction 124 at the target executed-instruction state. The check-hash instruction 124 has the corresponding expected hash-value 128 that is yet to be determined.

At 708, the computing device further inserts respective hash-input instructions within each of the plurality of basic blocks other than the second basic block. For example, the computing device 200 may insert the respective hash-input instructions 130 within the first basic block 110 and the one or more intermediate basic blocks 114. The hash-input instructions 130 have the corresponding hash input-values 132 that are yet to be determined.

After operation 708, the computing device continues to FIG. 8. At 710, the computing device sets an expected hash-value at an executed-instruction state of the reset-hash instruction to the initial hash-value. For example, the computing device 200 may set the hash value 408 at the executed-instruction state of the reset-hash instruction 122 to the initial hash-value 126.

At 712, the computing device sets respective expected hash-values at final executed-instruction states of the plurality of basic blocks other than the second basic block to a canonical value. For example, the computing device 200 may set the respective hash values 408 at executed-instruction states of the "if" and "jump" instructions to the canonical value 134.

At 714, the computing device determines an expected hash-value at the target executed-instruction state and the hash input-values for the hash-input instructions based on the initial hash-value, the canonical value, and the hash function. For example, the computing device 200 may determine a hash value 408 at the target executed-instruction state for the instruction D and the hash input-values 132 for the hash-input instructions 130 based on the initial hash-value 126, the canonical value 134, and the hash function 118.

At 716, the computing device compiles the function with the function instructions, the reset-hash instruction, the hash-input instructions with the hash input-values, and the check-hash instruction with the expected hash-value at the target executed-instruction state. For example, the computing device 200 may compile the function with the function instructions 106, the reset-hash instruction 122, the hash-input instructions 130 with the hash input-values 132, and the check-hash instruction 124 with the expected hash-value 128 at the target executed-instruction state. The compiled function 104 may also include the hash function 118 and the instruction input-values 120.

Figure 9:
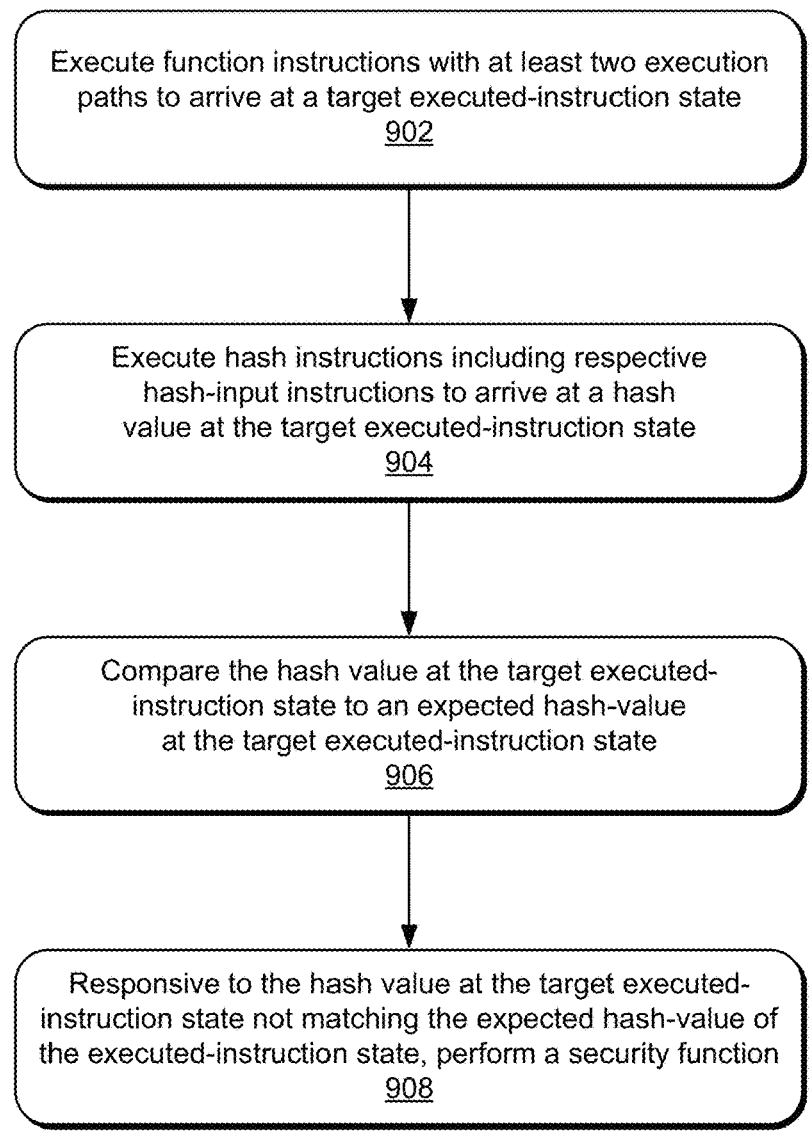
FIG. 9 illustrates an example method of using expected hash-values in functions with control flow.

FIG. 9 illustrates an example method 900 for utilizing expected hash-values in functions with control flow. This method can be implemented utilizing the previously described examples, such as the process flow 500 and the computing device 600. Aspects of this method are illustrated as operations 902 through 908. The order in which operations of this method are shown and/or described is not intended to be construed as a limitation, and any number or combination of the described method operations can be combined in any order to implement a method or an alternate method.

At 902, a computing device executes function instructions with at least two execution paths to arrive at a target executed-instruction state. For example, the execution module 504 of computing device 600 may execute the function instructions 106 taking either the first execution path 302 or the second execution path 304 to arrive at the executed-instruction state for the check-hash instruction 124.

At 904, the computing device executes hash instructions, including respective hash-input instructions to arrive at a hash value at the target executed-instruction state. For example, the hash module 506 of the computing device 600 may execute the hash instructions 116 including the hash-input instructions 130 to arrive at the hash value 408 at the executed-instruction state for check-hash instruction 124.

At 906, the computing device then compares the hash value at the target executed-instruction state to an expected hash-value at the target executed-instruction state. For example, the hash module 506 of the computing device 600 may compare the hash value 408 at the executed-instruction state for the check-hash instruction 124 to the expected hash-value 128.

At 908, the computing device, responsive to the hash value at the target executed-instruction state not matching the expected hash-value of the executed-instruction state, perform a security function. For example, the hash module 506 of the computing device 600 may cause the security function 510 to be executed. The security function may be an alert, stop the function from continuing, or any other suitable security measure when an execution fault has occurred.

The preceding discussion describes methods relating to determining and utilizing expected hash-values in functions with control flow. Aspects of these methods may be implemented in hardware (e.g., fixed logic circuitry), firmware, software, or any combination thereof. These techniques may be realized using one or more of the entities or components shown in FIGS. 2 and 6, which may be further divided, combined, and so on. Thus, these figures illustrate some of the many possible systems or apparatuses capable of employing the described techniques. The entities and components of these figures generally represent software, firmware, hardware, whole devices or networks, or a combination thereof.

EXAMPLES

Example 1: A method performed by a computing device, the method comprising: receiving a function, the function comprising: function instructions; a plurality of basic blocks comprising respective portions of the function instructions; and at least two execution paths between a first basic block and a second basic block of the plurality of basic blocks; establishing a hash function, the hash function used to compute respective hash values at executed-instruction states of the function instructions; inserting a reset-hash instruction within the first basic block, the reset-hash instruction setting a hash value at an executed-instruction state of the reset-hash instruction to an initial hash-value; selecting a target executed-instruction state within the second basic block; inserting a check-hash instruction at the target executed-instruction state, the check-hash instruction comparing a hash value at the target executed-instruction state to an expected hash-value at the target executed-instruction state; inserting respective hash-input instructions within each of the plurality of basic blocks other than the second basic block, the hash-input instructions setting respective hash input-values to the hash function for computing hash values at executed-instruction states of the hash-input instructions; determining the expected hash-value at the target executed-instruction state and the hash input-values for the hash-input instructions based on the initial hash-value, a canonical value, and the hash function; and forming a compiled function including: the function instructions; the reset-hash instruction with the initial hash-value; the hash-input instructions with the corresponding hash input-values; and the check-hash instruction with the expected hash-value at the target executed-instruction state.

Example 2: The method of example 1, further comprising: setting a hash value at an executed-instruction state of the reset-hash instruction to the initial hash-value; and setting respective hash values at final executed-instruction states of the plurality of basic blocks other than the second basic block to the canonical value, wherein the expected hash-value at the target executed-instruction state and the hash input-values are further based on the hash value at the executed-instruction state of the reset-hash instruction and the respective hash values at the final executed-instruction states.

Example 3: The method of example 1 or 2, wherein respective instruction encoding values are used as instruction input-values for the hash function at executed-instruction states of the function instructions.

Example 4: The method of any of examples 1 to 3, wherein the canonical value is based on the target executed-instruction state.

Example 5: The method of any of examples 1 to 4, wherein the canonical value is based on instruction encoding values prior to the target executed-instruction state.

Example 6: The method of any of examples 1 to 5, wherein the respective hash-input instructions are inserted before branch or jump instructions.

Example 7: The method of any of examples 1 to 6, wherein the at least two execution paths correspond to at least one intermediate basic block between the first and second basic blocks.

Example 8: The method of any of examples 1 to 7, wherein the method is performed by a compiler.

Example 9: A method performed by a computing device, the method comprising: executing function instructions to arrive at a target executed-instruction state, the function instructions: comprised by a plurality of basic blocks of the function instructions; and having at least two execution paths between a first basic block and a second basic block of the plurality of basic blocks, the target executed-instruction state being within the second basic block; executing hash instructions within the plurality of basic blocks to arrive at a hash value at the target executed-instruction state, the hash instructions including respective hash-input instructions within each of the plurality of basic blocks other than the second basic block; comparing the hash value at the target executed-instruction state to an expected hash-value at the target executed-instruction state, the expected hash-value at the target executed-instruction state irrespective of which of the execution paths were executed; and responsive to the hash value at the target executed-instruction state not matching the expected hash-value of the executed-instruction state, performing a security function.

Example 10: The method of example 9, wherein the hash instructions further include: a reset-hash instruction in the first basic block; and a check-hash instruction in the second basic block.

Example 11: The method of example 9 or 10, wherein the hash-input instructions utilize a hash input-value table, wherein each hash-input instruction has a corresponding hash input-value in the hash input-value table.

Example 12: The method of any of examples 9 to 11, wherein the hash-input instructions are executed prior to branch or jump instructions.

Example 13: The method of any of examples 9 to 12, wherein the hash instructions are executed by a hardware device separate from a processor that executes the function instructions.

Example 14: The method of any of examples 9 to 12, wherein the hash instructions are executed by a module of a processor that executes the function instructions.

Example 15: A computing device comprising: at least one processor; and at least one computer-readable storage media device comprising instructions that, when executed by the at least one processor, cause the processor to perform the method of any preceding claim.

Although implementations of determining expected hash-values in functions with control flow have been described in language specific to certain features and/or methods, the subject of the appended claims is not necessarily limited to the specific features or methods described. Rather, the specific features and methods are disclosed as example implementations for determining expected hash-values in functions with control flow. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method performed by a computing device, the method comprising:
   executing function instructions to arrive at a target executed-instruction state, the function instructions:
      comprising a plurality of basic blocks of the function instructions;
      having at least two execution paths between a first basic block and a second basic block of the plurality of basic blocks, and
      the target executed-instruction state being within the second basic block;
   executing hash instructions within the plurality of basic blocks to arrive at a hash value at the target executed-instruction state, the hash instructions including respective hash-input instructions within each of the plurality of basic blocks other than the second basic block;
   determining an expected hash-value at the target executed-instruction state based on an initial hash-value and a hash function, the determining of the expected hash-value at the target executed-instruction state resulting in a same hash-value regardless of which of the at least two execution paths are executed between the first basic block and the second basic block;
   comparing the hash value at the target executed-instruction state to the expected hash-value at the target executed-instruction state; and
   responsive to the hash value at the target executed-instruction state not matching the expected hash-value of the executed-instruction state, performing a security function.

2. The method of claim 1, wherein the expected hash-value at the target executed-instruction state is determined based on the initial hash-value, the hash function, and a canonical value.

3. The method of claim 1, wherein the hash instructions further include:
   a reset-hash instruction in the first basic block; and
   a check-hash instruction in the second basic block.

4. The method of claim 1, wherein the hash-input instructions utilize a hash input-value table, wherein each hash-input instruction has a corresponding hash input-value in the hash input-value table.

5. The method of claim 1, wherein the hash-input instructions are executed prior to a branch instruction or a jump instruction.

6. The method of claim 1, wherein the hash instructions are executed by a hardware device separate from a processor that executes the function instructions.

7. The method of any of claim 1, wherein the hash instructions are executed by a module of a processor that executes the function instructions.

8. The method of claim 1, wherein the security function comprises one of an error code, a warning, a program-stop, a processor-lock, or a security protocol.

9. A computing device comprising:
at least one computer-readable storage media device comprising function instructions that include a plurality of basic blocks of the function instructions, the function instructions having at least two execution paths between a first basic block and a second basic block of the plurality of basic blocks, and a target executed-instruction state being within the second basic block; and
at least one processor configured to execute the function instructions to implement operations comprising:
executing the function instructions to arrive at the target executed-instruction state;
executing hash instructions within the plurality of basic blocks to arrive at a hash value at the target executed-instruction state, the hash instructions including respective hash-input instructions within each of the plurality of basic blocks other than the second basic block;
determining an expected hash-value at the target executed-instruction state based on an initial hash-value and a hash function, the determining of the expected hash-value at the target executed-instruction state resulting in a same hash-value regardless of which of the at least two execution paths are executed between the first basic block and the second basic block;
comparing the hash value at the target executed-instruction state to the expected hash-value at the target executed-instruction state; and
responsive to the hash value at the target executed-instruction state not matching the expected hash-value of the executed-instruction state, performing a security function.

10. The computing device of claim 9, wherein the operations further comprise determining the expected hash-value at the target executed-instruction state determined based on the initial hash-value, the hash function, and a canonical value.

11. The computing device of claim 9, wherein the hash instructions further include:
a reset-hash instruction in the first basic block; and
a check-hash instruction in the second basic block.

12. The computing device of claim 9, wherein the hash-input instructions utilize a hash input-value table, wherein each hash-input instruction has a corresponding hash input-value in the hash input-value table.

13. The computing device of claim 9, wherein the hash-input instructions are executed prior to a branch instruction or a jump instruction.

14. A non-transitory computer-readable storage media comprising function instructions that include a plurality of basic blocks of the function instructions, the function instructions having at least two execution paths between a first basic block and a second basic block of the plurality of basic blocks, and a target executed-instruction state being within the second basic block, the functions instructions configured to, responsive to execution by one or more processors of a computing device, direct the one or more processors to:
execute the function instructions to arrive at the target executed-instruction state;
execute hash instructions within the plurality of basic blocks to arrive at a hash value at the target executed-instruction state, the hash instructions including respective hash-input instructions within each of the plurality of basic blocks other than the second basic block;
determine an expected hash-value at the target executed-instruction state based on an initial hash-value and a hash function, the determination of the expected hash-value at the target executed-instruction state resulting in a same hash-value regardless of which of the at least two execution paths are executed between the first basic block and the second basic block;
compare the hash value at the target executed-instruction state to the expected hash-value at the target executed-instruction state; and
responsive to the hash value at the target executed-instruction state not matching the expected hash-value of the executed-instruction state, perform a security function.

15. The non-transitory computer-readable storage media of claim 14, wherein the processor is further directed to determine the expected hash-value at the target executed-instruction state determined based on the initial hash-value, the hash function, and a canonical value.

16. The non-transitory computer-readable storage media of claim 14, wherein the hash instructions further include:
a reset-hash instruction in the first basic block; and
a check-hash instruction in the second basic block.

17. The non-transitory computer-readable storage media of claim 14, wherein the hash-input instructions utilize a hash input-value table, wherein each hash-input instruction has a corresponding hash input-value in the hash input-value table.

18. The non-transitory computer-readable storage media of claim 14, wherein the hash-input instructions are executed prior to a branch instruction or a jump instruction.

19. The non-transitory computer-readable storage media of claim 14, wherein the hash instructions are executed by a module of the one or more processors that executes the function instructions.

20. The non-transitory computer-readable storage media of claim 14, wherein the security function comprises one of an error code, a warning, a program-stop, a processor-lock, or a security protocol.

* * * * *